(12) United States Patent
Lee et al.

(10) Patent No.: US 12,459,479 B2
(45) Date of Patent: Nov. 4, 2025

(54) HYDRAULIC VALVE BLOCK AND BRAKE DRIVING DEVICE INCLUDING THE SAME

(71) Applicant: HL MANDO CORPORATION, Gyeonggi-do (KR)

(72) Inventors: Chungjae Lee, Gyeonggi-do (KR); I Jin Yang, Gyeonggi-do (KR); Mingeun Song, Daejeon (KR); Heejun Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 218 days.

(21) Appl. No.: 18/121,736

(22) Filed: Mar. 15, 2023

(65) Prior Publication Data
US 2023/0294656 A1   Sep. 21, 2023

(30) Foreign Application Priority Data

Mar. 15, 2022   (KR) .................. 10-2022-0031959

(51) Int. Cl.
*B60T 17/00*   (2006.01)
*B60T 13/66*   (2006.01)

(52) U.S. Cl.
CPC .............. *B60T 17/00* (2013.01); *B60T 13/66* (2013.01); *B60T 17/002* (2013.01)

(58) Field of Classification Search
CPC ...... F15B 7/08; F15B 13/0814; F16K 27/029; B60T 7/04; B60T 7/042; B60T 8/368;
(Continued)

(56) References Cited

U.S. PATENT DOCUMENTS

| | | | | |
|---|---|---|---|---|
| 5,449,226 A | * | 9/1995 | Fujita | B60T 17/02 303/119.3 |
| 2018/0326962 A1 | * | 11/2018 | Kim | B60T 13/686 |
| 2021/0309197 A1 | * | 10/2021 | Weh | B60T 8/368 |

FOREIGN PATENT DOCUMENTS

| | | | | |
|---|---|---|---|---|
| CN | 102294997 | | 12/2011 | |
| CN | 104203672 A | * | 12/2014 | B60T 8/368 |

(Continued)

OTHER PUBLICATIONS

English machined translation of CN—102294997 B, Mar. 13, 2013.*

(Continued)

*Primary Examiner* — Robert A. Siconolfi
*Assistant Examiner* — San M Aung
(74) *Attorney, Agent, or Firm* — WOMBLE BOND DICKINSON (US) LLP (57) ABSTRACT

The present disclosure relates to a hydraulic valve block and a brake driving device including the same. A hydraulic valve block of a brake driving device in which an electronic control unit is supported by one side and a motor unit controlled by the electronic control unit is supported by the other side is provided. The hydraulic valve block includes a block body in which a valve operated by an electric signal input from the electronic control unit and controlling the flow of brake oil is installed, a block through-hole formed on the block body to support the motor unit, a vent channel formed through the block body, and a first vent hole formed at one end of the vent channel and disposed above the center of the block through-hole on the other side of the block body by which the motor unit is supported.

6 Claims, 6 Drawing Sheets

(58) Field of Classification Search
CPC ........ B60T 8/409; B60T 8/4031; B60T 13/12;
B60T 13/66; B60T 13/662; B60T 13/686;
B60T 17/00; B60T 17/002; B60T 17/02
USPC .......................................................... 303/10
See application file for complete search history.

(56) References Cited

FOREIGN PATENT DOCUMENTS

| | | | | |
|---|---|---|---|---|
| CN | 20210128744 A | * | 10/2021 | |
| DE | 102012209218 A1 | * | 12/2013 | ............. B60T 8/368 |
| KR | 10-2021-0124916 | | 10/2021 | |
| KR | 20210128744 A | * | 10/2021 | ............ B60T 17/221 |
| WO | WO-2020032495 A1 | * | 2/2020 | ............. B60T 17/02 |

OTHER PUBLICATIONS

Office Action dated Sep. 25, 2025 for Korean Patent Application No. 10-2022-0031959 and its English translation provided by Applicant's foreign counsel.

* cited by examiner

HYDRAULIC VALVE BLOCK AND BRAKE DRIVING DEVICE INCLUDING THE SAME

CROSS-REFERENCE TO RELATED APPLICATIONS

This application claims benefit and priority to Korean Patent Application No. 10-2022-0031959, filed on Mar. 15, 2022, with the Korean Intellectual Property Office, the disclosure of which is incorporated herein in its entirety by reference.

TECHNICAL FIELD

Embodiments of the present disclosure relate to a hydraulic valve block and a brake driving device including the same, and more specifically, a hydraulic valve block capable of improving a lifespan thereof by maintaining pressure equilibrium inside the brake driving device and a brake driving device including the same.

BACKGROUND

In general, a brake driving device provides a braking force according to a pressing force when a driver of a vehicle in which the brake driving device is installed presses a brake pedal. This braking force is provided to wheels of the vehicle to reduce the speed of the vehicle so that braking is performed.

A magnitude of the braking force is changed according to the pressing force through switching and positioning of a plurality of solenoid valves by hydraulic pressure and provided to the vehicle.

In the case of a brake driving device that requires a compact installation space, when a motor operates, a pressure inside the motor increases and the motor is damaged. The damage of the motor deteriorates a lifespan of the brake driving device, and there is a problem in that time and cost are consumed for replacement of the motor.

Specifically, due to the increase in the internal pressure of the motor, in the brake driving device, there is a problem that the lifespan of the brake driving device and a replacement cycle of parts constituting the brake driving device are shortened.

SUMMARY

One embodiment of the present disclosure is to provide a hydraulic valve block which communicates an inside of a motor unit in which a pressure rise of the motor unit is generated according to an operation of the motor unit with an outside thereof to maintain pressure equilibrium inside the motor unit and a brake driving device including the same.

According to an aspect of the present disclosure, there is provided a hydraulic valve block of a brake driving device in which an electronic control unit is supported by one side and a motor unit controlled by the electronic control unit is supported by the other side, the hydraulic valve block including: a block body in which a valve operated by an electric signal input from the electronic control unit and controlling the flow of brake oil is installed; a block through-hole formed on the block body to support the motor unit; a vent channel formed through the block body; and a first vent hole formed at one end of the vent channel and disposed above the center of the block through-hole on the other side of the block body by which the motor unit is supported.

The first vent hole may be formed in a motor support area facing a part of the motor unit on the other side of the block body.

The hydraulic valve block may further include a second vent hole formed at the other end of the vent channel and disposed on one side of the block body.

A center of the second vent hole may be disposed relatively higher than a center of the first vent hole on the block body.

The hydraulic valve block may further include a second vent hole formed at the other end of the vent channel and disposed to communicate with a neighboring surface of the block body adjacent to the other side surface of the block body by which the motor unit is supported.

The second vent hole may be formed in a lower portion of the block body.

According to another aspect of the present disclosure, there is provided a brake driving device including: an electronic control unit; a motor unit controlled by the electronic control unit; a hydraulic block body in which a valve operated by an electric signal input from the electronic control unit to control a flow of brake oil is installed and which includes a block body in which the electronic control unit is supported by one side and the motor unit is supported by the other side; and a vent unit configured to maintain an internal pressure equilibrium according to an operation of the motor unit.

The vent unit may include a vent channel formed through the block body and guiding the motor unit to communicate with the outside of the block body.

The vent unit may further include a first vent hole disposed on the other side of the block body and formed at one end of the vent channel.

The first vent hole may be formed to face a part of the motor unit.

A block through-hole supporting the motor unit may be formed in the block body, and a center of the first vent hole is disposed relatively higher than a center of the block through-hole on the block body.

The vent unit may further include a second vent hole disposed on one side of the block body and formed on the other side of the vent channel.

The second vent hole may be disposed to face the electronic control unit.

The vent unit may further include a second vent hole disposed in communication with a lower portion of the block body and communicating with the other side of the vent channel. The vent unit may further include a filter unit installed in the block body to communicate with the second vent hole.

In one embodiment of the present disclosure, according to the hydraulic valve block and the brake driving device including the same, the inside of the motor unit in which a pressure rise of the motor unit is generated according to the operation of the motor unit communicates with the outside thereof, and thus, it is possible to maintain pressure equilibrium inside the motor unit.

DETAILED DESCRIPTION

Hereinafter, with reference to the accompanying drawings, one embodiment of the present disclosure will be described in detail so that a person having ordinary knowledge in the technical field to which the present disclosure belongs can easily practice it. The present disclosure may be implemented in several different forms and is not limited to the embodiments described herein.

It is advised that the drawings are schematic and not drawn to scale. Relative dimensions and proportions of parts in the drawings are illustrated exaggerated or reduced in size for clarity and convenience in the drawings, and any dimensions are illustrative only and not limiting. In addition, the same reference numerals are used to indicate similar features in the same structural elements or parts appearing in two or more drawings.

One embodiment of the present disclosure specifically represents an ideal embodiment of the present disclosure. As a result, various variations of the drawings are expected. Therefore, the embodiment is not limited to the specific shape of the illustrated area, and includes, for example, modification of the shape by manufacturing.

Hereinafter, a brake driving device 101 according to one embodiment of the present disclosure will be described with reference to FIGS. 1 to 4.

Figure 1:
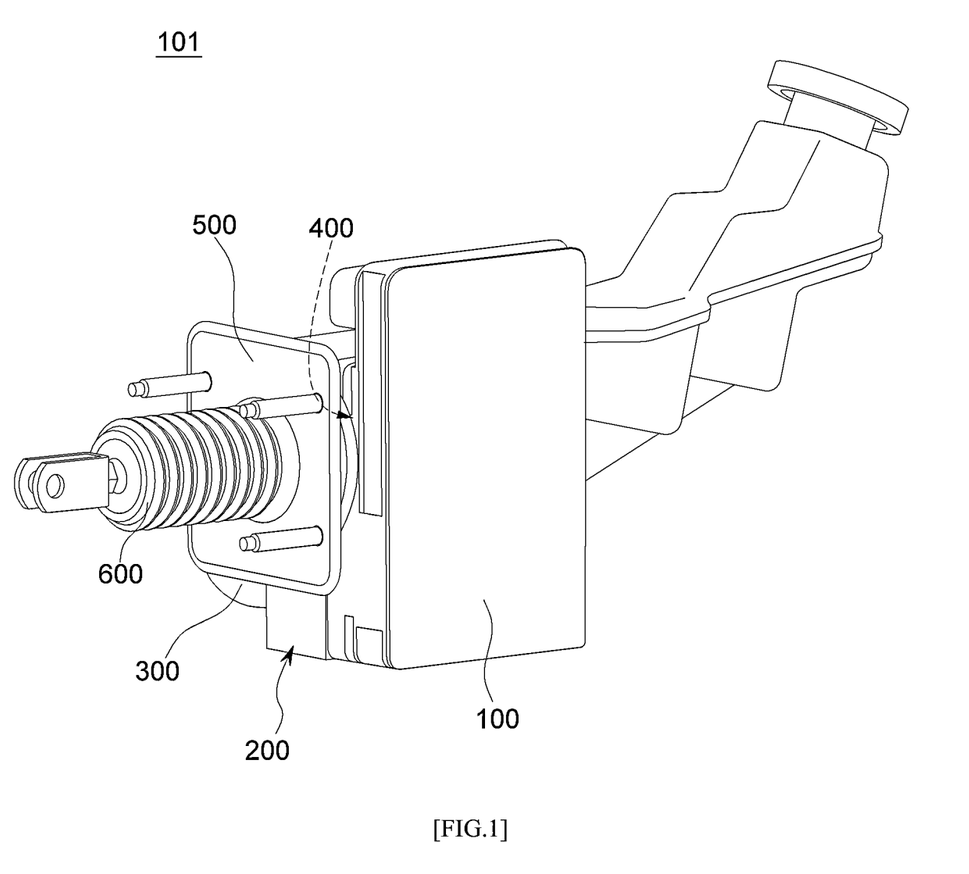
FIG. 1 is a diagram illustrating a brake driving device according to one embodiment of the present disclosure.
Figure 2:
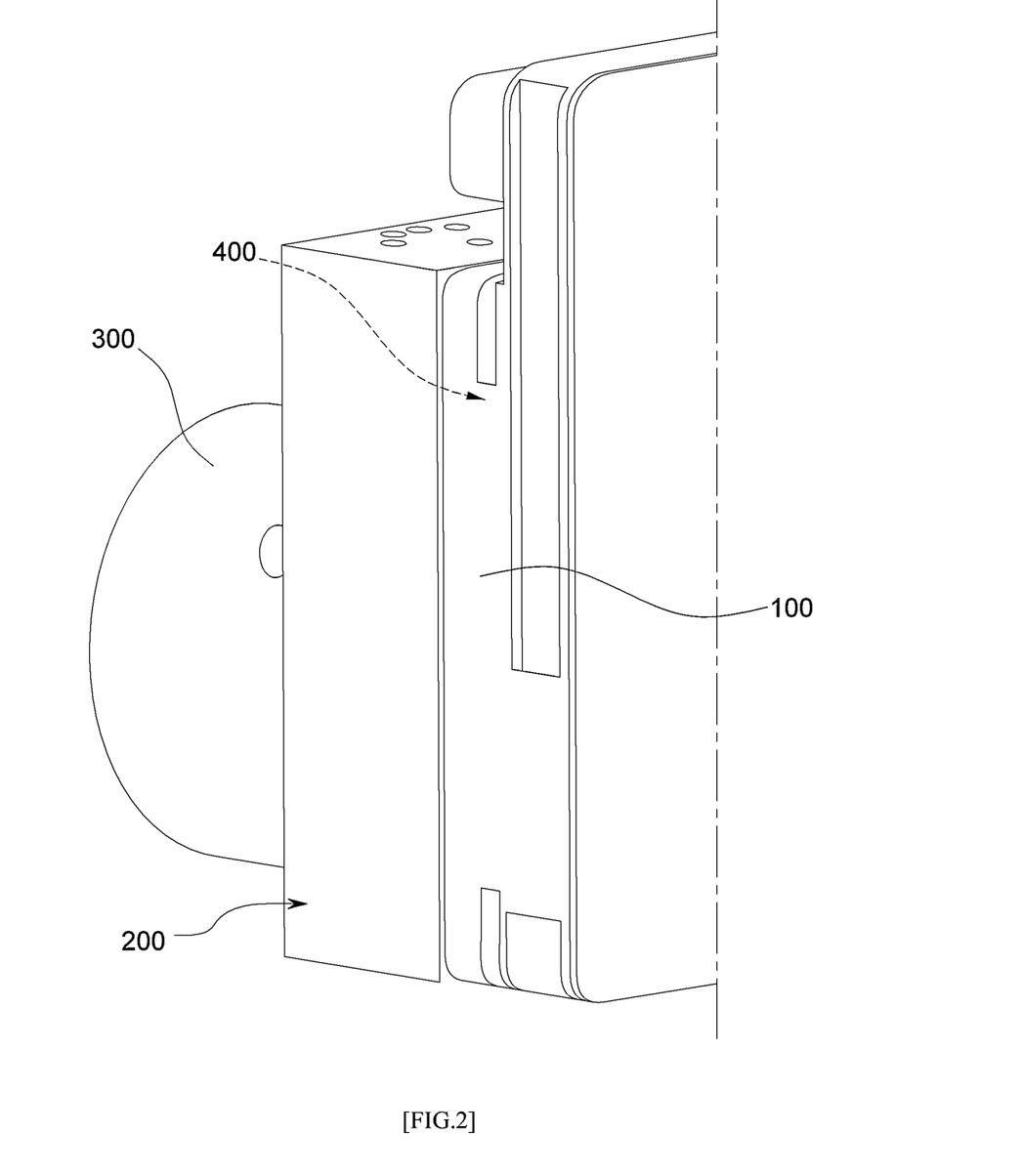
FIG. 2 illustrates an enlarged side view of FIG. 1.

As illustrated in FIGS. 1 and 2, the brake driving device 101 includes an electronic control unit 100, a hydraulic valve block 200, a motor unit 300, and a vent unit 400.

The electronic control unit 100 receives information from sensors capable of detecting a pressing force of a pedal or a displacement of the pedal. Specifically, in the brake driving device 101, as illustrated in FIG. 1, a mounting bracket 500 is supported by a vehicle and the brake pedal is installed on the input rod 600 to receive a pedal effort from a driver.

A valve for controlling the hydraulic valve block 200 includes a channel formed inside the hydraulic valve block 200, and thus, the valve is controlled by brake oil. In addition, the valve installed in the hydraulic valve block 200 is operated according to the electric signal input from the electronic control unit 100 and may control the flow of brake oil.

The electronic control unit 100 is installed on one side of the hydraulic valve block 200.

The motor unit 300 is supported by the other side of the hydraulic valve block 200. In addition, the motor unit 300 is controlled by receiving a signal from the electronic control unit 100. Specifically, the motor unit 300 may be supported by a side opposite to the electronic control unit 100 with respect to the hydraulic valve block 200.

The vent unit 400 communicates the inside of the motor unit 300 with the outside of the motor unit 300 so that equilibrium of an internal pressure according to the operation of the motor unit 300 can be maintained. Specifically, the vent unit 400 includes a vent channel 410, a first vent hole 411 that is one end of the vent channel 410, and a second vent hole 412 that is the other end of the vent channel 410. Moreover, the vent channel 410 is formed in the hydraulic valve block 200.

The brake driving device 101 according to one embodiment of the present disclosure may include a hydraulic valve block 200 according to a first embodiment of the present disclosure or a hydraulic valve block 202 according to a second embodiment of the present disclosure.

Figure 3:
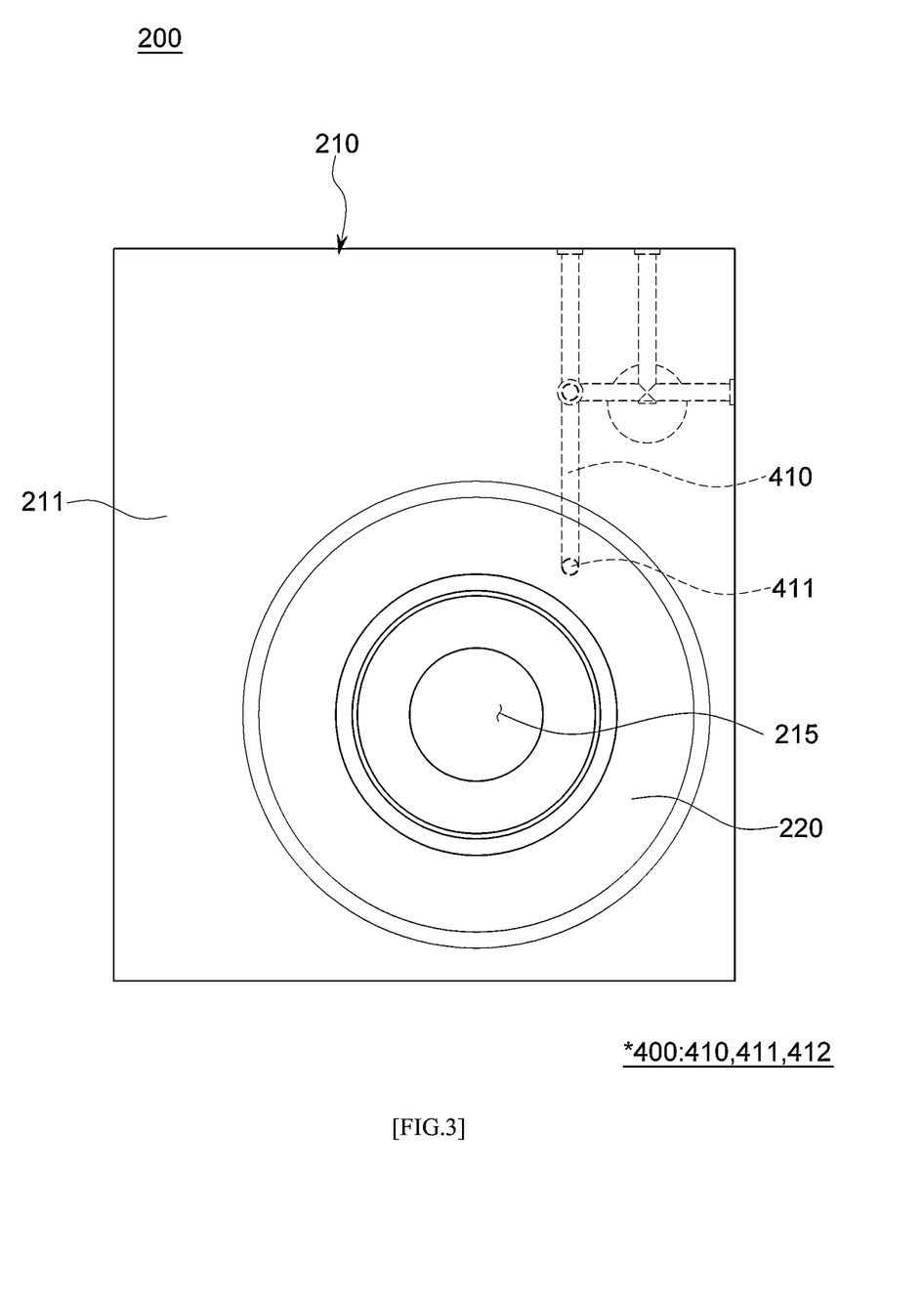
FIGS. 3 and 4 illustrate a hydraulic valve block according to a first embodiment of the present disclosure.
Figure 4:
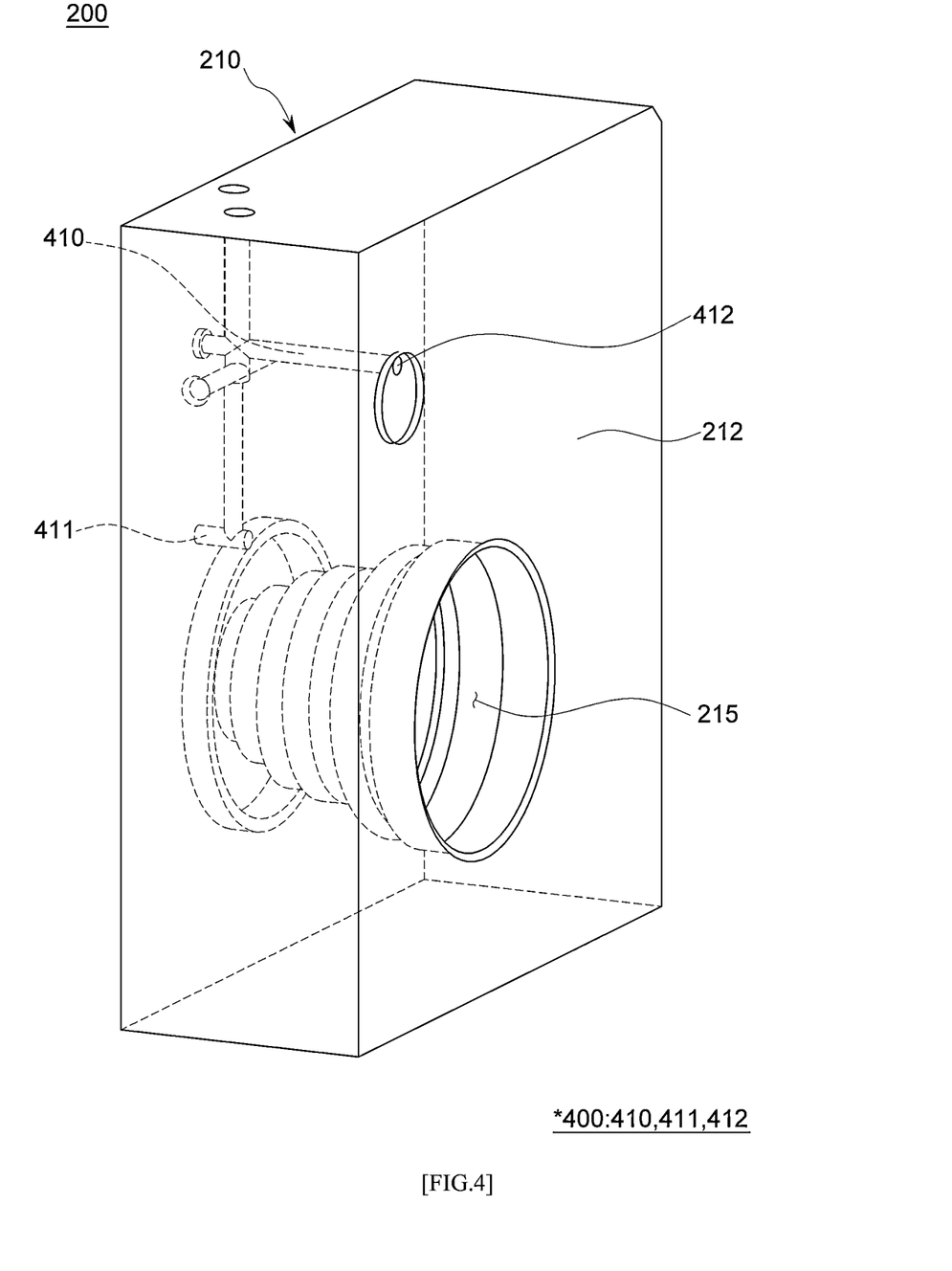

In addition, as illustrated in FIGS. 3 and 4, the hydraulic valve block 200 according to the first embodiment of the present disclosure includes a block body 210, a block through-hole 215, the vent channel 410, and the first vent hole 411.

Inside the block body 210, a valve (not illustrated) and a channel for regulating the brake oil by the valve and guiding movement of the brake oil are formed. In addition, the electronic control unit 100 is supported by one side of the block body 210 and the motor unit 300 is supported by the other side.

The block through-hole 215 is formed to support the motor unit 300 on the block body 210. Specifically, the block through-hole 215 may be formed to pass through the block body 210 so that a part of the motor unit 300 is inserted and supported.

The vent channel 410 is formed through the block body 210. In addition, the vent channel 410 may be spaced apart from the block through-hole 215 and formed through the block body 210. The vent channel 410 may guide the pressure and heat inside the motor unit 300 so that the pressure and heat are discharged to the outside. That is, outside air may be introduced through the vent channel 410 and air inside the motor unit 300 may be discharged.

The first vent hole 411 may be formed at one end of the vent channel 410. The first vent hole 411 may guide the pressure and heat inside the motor unit 300 so that the pressure and heat move to the outside of the motor unit 300.

In addition, the first vent hole 411 is disposed on the other side of the block body 210 by which the motor unit 300 is supported. A center of the first vent hole 411 may be disposed above a center of the block through-hole 215.

Accordingly, in the hydraulic valve block 200 according to the first embodiment of the present disclosure, the first vent hole 411 is disposed above the center of the block through-hole 215. Therefore, when oil leaks to the inside of the motor unit 300, the oil is accumulated on the lower side of the inside of the motor unit 300, and the oil flows into the first vent hole 411 to prevent the first vent hole 411 or the vent channel 410 from being clogged.

That is, since the first vent hole 411 is disposed above the center of the block through-hole 215, the leaked oil accumulated in the lower part of the motor unit 300 by gravity prevents inflow of the oil leaking to the first vent hole 411 and can effectively communicate with the motor unit 300.

In addition, the first vent hole 411 according to the first embodiment of the present disclosure may be formed in a motor support area 220 as illustrated in FIGS. 3 and 4.

The motor support area 220 may be formed on the other side surface 211 of the block body 210 supporting the motor unit 300. This motor support area 220 may face a part of the motor unit 300. Specifically, the motor support area 220 is an area of the other side surface 211 of the block body 210 so as to surround the block through-hole 215, and may be a motor seal area for maintaining watertight between the motor unit 300 and the block body 210.

The first vent hole 411 is formed in the motor support area 220 to prevent moisture from entering the vent channel 410 when air moves between the motor unit 300 and the vent channel 410. That is, when the motor unit 300 and the block body 210 are coupled, a first vent hole 411 is formed in the seal area for maintaining watertightness, and the first vent hole 411 prevents inflow of the moisture and can effectively guide pressure and heat so that the pressure and heat are discharged between the motor unit 300 and the vent channel 410.

In addition, a second vent hole 412 may be formed at the other end of the vent channel 410 formed in the hydraulic valve block 200 according to the first embodiment of the present disclosure.

The second vent hole 412 may be disposed on one side surface 212 of the block body 210. In addition, the second vent hole 412 is spaced apart from the block through-hole 215 on one side surface 212 of the block body 210 and may guide heat and pressure moved to the vent channel 410 through the motor unit 300 so that the heat and pressure move to the outside of the block body 210.

For example, the second vent hole 412 communicates with the electronic control unit 100 to allow heat and pressure of the motor unit 300 to be discharged to a filter unit supported by the electronic control unit 100. Therefore, it is possible to effectively allow external air to flow into the motor unit 300 through the vent channel 410 through the filter unit supported by the electronic control unit 100.

In addition, a center of the second vent hole 412 of the hydraulic valve block 200 according to the first embodiment of the present disclosure may be disposed relatively higher than the center of the first vent hole 411.

The second vent hole 412 may guide the outside air passing through the filter unit so that the outside air flows into the motor unit 300. Therefore, since the second vent hole 412 is disposed on the valve block 210 to be higher than the first vent hole 411, it is possible to reduce the inflow of contaminants into the second vent hole 412. Specifically, when the brake driving device 101 is supported by the vehicle through the mounting bracket 500, the center of the second vent hole 412 is disposed relatively higher than the center of the first vent hole 411, inflow of contaminants from the ground through which the vehicle passes into the second vent hole 412 can be effectively reduced.

Figure 5:
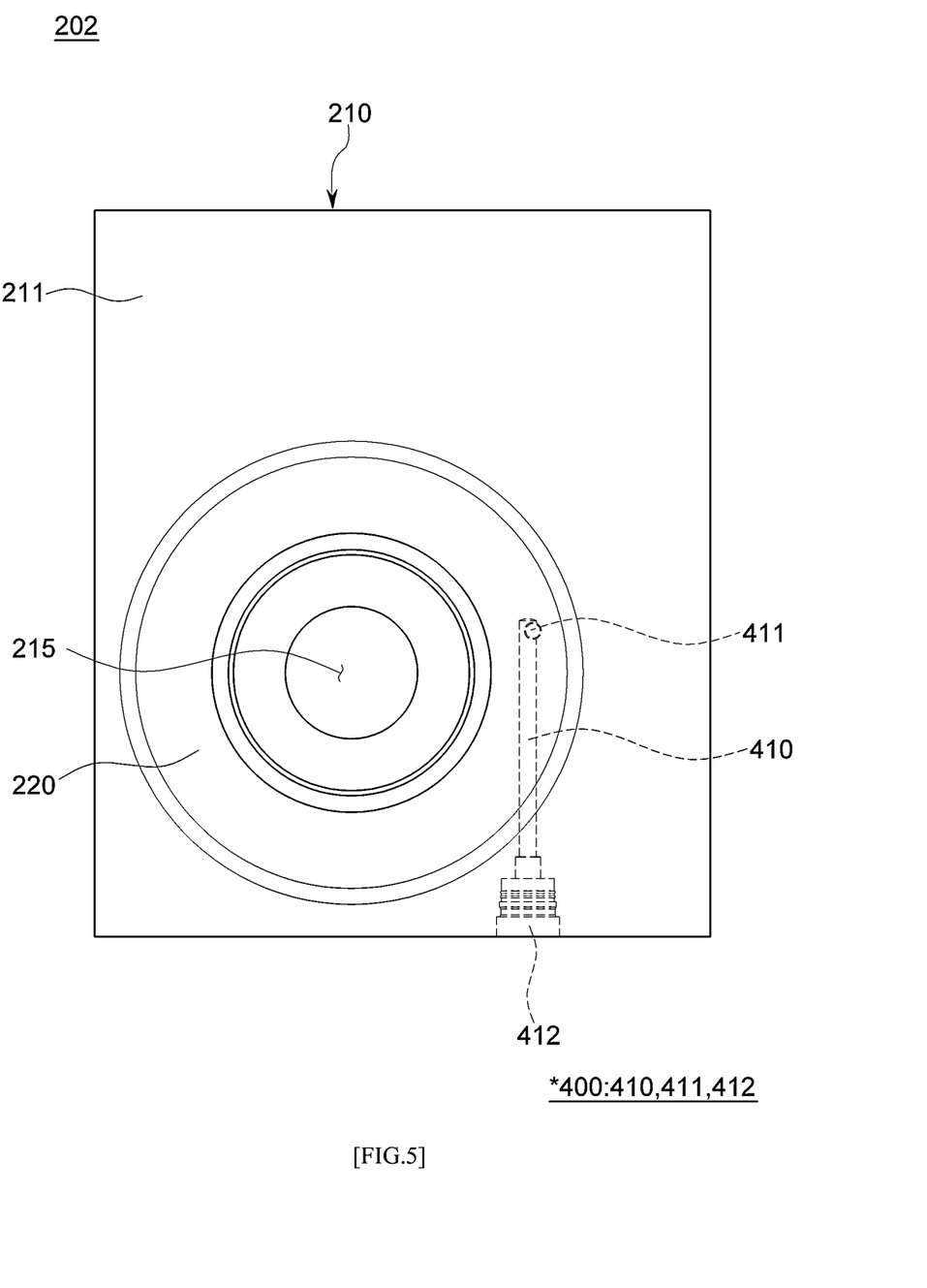
FIGS. 5 and 6 illustrate a hydraulic valve block according to a second embodiment of the present disclosure.
Figure 6:
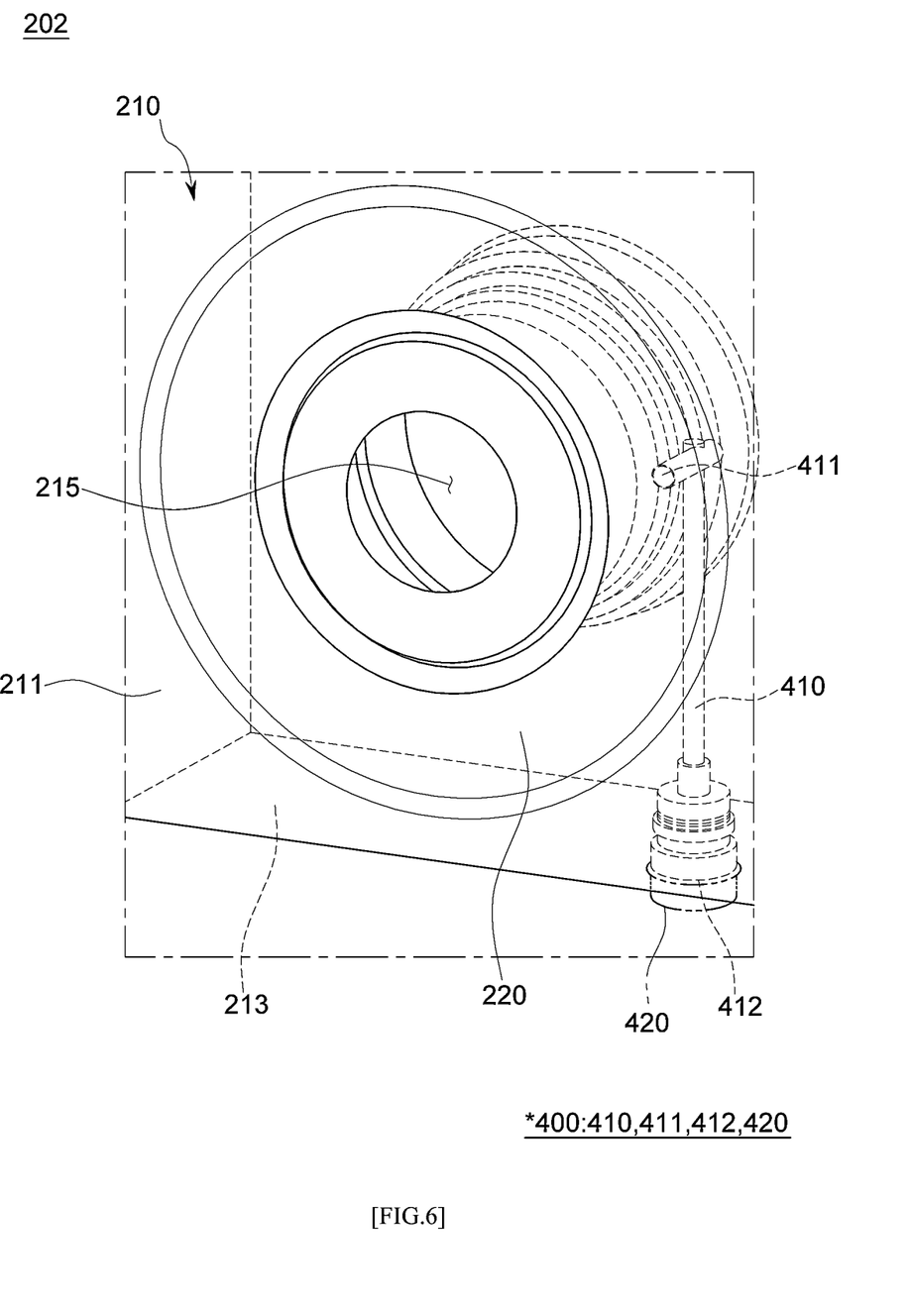

Hereinafter, the hydraulic valve block 202 according to a second embodiment of the present disclosure will be described with reference to FIGS. 5 and 6.

In the hydraulic valve block 202 according to the second embodiment of the present disclosure, the block body 210 of the hydraulic valve block 200, the vent channel 410, the configuration of the first vent hole 411, and the arrangement structure of the first vent hole 411 are the same as those of the first embodiment of the present disclosure described above.

The vent channel 410 of the hydraulic valve block 202 according to the second embodiment of the present disclosure may be formed through the block body 210.

The second vent hole 412, which is the other end of the vent channel 410 of the hydraulic valve block 202 according to the second embodiment of the present disclosure, may be disposed to communicate with a neighboring surface 213 of the block body 210 adjacent to the other side 211 of the block body 210.

The second vent hole 412 may be disposed to communicate between the other side of the block body 210 by which the motor unit 300 is supported and one side surface 212 of the block body 210 by which the electronic control unit 100 is supported. Specifically, the vent unit 400 of the brake driving device 101 according to one embodiment of the present disclosure may further include a filter unit 420. This filter unit 420 may be supported by the block body 210 to communicate with the second vent hole 412.

As an example, the neighboring surface 213 of the block body 210 of the hydraulic valve block 202 according to the second embodiment of the present disclosure may be a lower surface of the block body 210.

Accordingly, the filter unit 420 may be inserted into and supported by the adjacent surface 213 of the block body 210 to communicate with the second vent hole 412. In addition, the filter unit 420 may filter foreign substances included in the outside air when guiding the inflow of the outside air into the second vent hole 412. For example, the filter unit 420 may be a membrane.

With this configuration, the inside of the brake driving device 101 according to one embodiment of the present disclosure can communicate with the outside, so that pressure changes or heat generated inside the brake driving device 101 can be effectively eliminated.

Although the embodiment of the present disclosure has been described with reference to the accompanying drawings, those skilled in the art to which the present disclosure pertains can understand that the present disclosure can be implemented in other specific forms without changing the technical spirit or essential features.

Therefore, the embodiment described above should be understood as illustrative in all respects and not limiting, and the scope of the present invention is indicated by the claims to be described later, and all changes or modifications derived from the meaning and scope of the claims and their equivalent concepts should be construed as being included in the scope of the present invention.

DETAILED DESCRIPTION OF MAIN ELEMENTS

100: electronic control unit
101: brake driving device
200,202: hydraulic valve block
210: block body
220: motor installation area
215: block through-hole
400: vent unit
410: vent channel
411: first vent hole
412: second vent hole
420: filter unit

What is claimed is:

1. A hydraulic valve block of a brake driving device in which an electronic control unit is supported by one side and a motor unit controlled by the electronic control unit is supported by the other side, the hydraulic valve block comprising:
   a block body in which a valve operated by an electric signal input from the electronic control unit and controlling the flow of brake oil is installed;
   a block through-hole formed on the block body to support the motor unit;
   a vent channel formed through the block body;
   a first vent hole formed at one end of the vent channel and disposed above the center of the block through-hole on the other side of the block body by which the motor unit is supported; and
   a second vent hole formed at the other end of the vent channel and disposed to communicate with the electronic control unit on one side of the block body,
   wherein a center of the second vent hole is disposed relatively higher than a center of the first vent hole on the block body.

2. The hydraulic valve block of claim 1, further comprising a filter unit installed in the block body to communicate with the second vent hole.

3. A brake driving device comprising:
   an electronic control unit;

a motor unit controlled by the electronic control unit;

a hydraulic block body in which a valve operated by an electric signal input from the electronic control unit to control a flow of brake oil is installed and which includes a block body in which the electronic control unit is supported by one side and the motor unit is supported by the other side; and a vent unit configured to maintain an internal pressure equilibrium according to an operation of the motor unit, wherein the vent unit includes:

a vent channel formed through the block body and guiding the motor unit to communicate with the outside of the block body;

a first vent hole disposed on the other side of the block body and formed at one end of the vent channel, wherein a block through-hole supporting the motor unit is formed in the block body, and a center of the first vent hole is disposed relatively higher than a center of the block through-hole on the block body; and a second vent hole disposed in communicate with the electronic control unit on one side of the block body and formed on the other side of the vent channel.

4. The brake driving device of claim 3, wherein the first vent hole is formed to face a part of the motor unit.

5. The brake driving device of claim 3, wherein the second vent hole faces the electronic control unit.

6. The brake driving device of claim 3, wherein the electronic control unit includes a filter unit facing the second vent hole.

\* \* \* \* \*